US006550277B1

(12) United States Patent
Uebbing et al.

(10) Patent No.: US 6,550,277 B1
(45) Date of Patent: Apr. 22, 2003

(54) QUARTZ GLASS BODY FOR OPTICAL COMPONENT AND PROCESS FOR MANUFACTURE THEREOF

(75) Inventors: Bruno Uebbing, Alzenhau (DE); Jan Vydra, Hanau (DE)

(73) Assignee: Heraeus Quarzglas GmbH & Co. KG, Hanau (DE)

( * ) Notice: Subject to any disclaimer, the term of this patent is extended or adjusted under 35 U.S.C. 154(b) by 279 days.

(21) Appl. No.: 09/709,168

(22) Filed: Nov. 10, 2000

(30) Foreign Application Priority Data

Nov. 15, 1999 (DE) .......................................... 199 54 759
Feb. 4, 2000 (DE) .......................................... 100 05 051

(51) Int. Cl.$^7$ ............................................. C03B 19/06
(52) U.S. Cl. ......................... 65/17.4; 65/17.6; 65/33.2; 65/104; 65/117; 65/378; 65/397; 65/426; 65/427; 65/DIG. 8; 65/DIG. 16; 501/905
(58) Field of Search ........................... 501/905; 65/17.4, 65/17.6, 33.2, 104, 117, 378, 397, 426, 427, DIG. 8, DIG. 16

(56) References Cited

U.S. PATENT DOCUMENTS 5,668,067 A    9/1997   Araujo et al.

FOREIGN PATENT DOCUMENTS

| DE | 199 42 443 A  | 3/2000 |
| EP | 0 536 631 A1  | 4/1993 |
| EP | 0 546 196 A   | 6/1993 |
| EP | 0 536 631 B1  | 8/1995 |
| EP | 0 691 312 A1  | 1/1996 |
| EP | 0 691 312 A   | 1/1996 |
| WO | WO 00/39038   | 7/2000 |
| WO | WO 00/48046   | 8/2000 |

OTHER PUBLICATIONS

Patent Abstracts of Japan for JP 11116255 Apr. 27, 1999.
Patent Abstracts of Japan for JP 08081226 Sep. 16, 1994.
Patent Abstracts of Japan for JP 07215731 Aug. 15, 1995.
Patent Abstracts of Japan for JP 11001331 Jan. 6, 1999.
Patent Abstracts of Japan for JP 08183621 Jul. 16, 1996.
Patent Abstracts of Japan for JP 05178632 Jul. 20, 1993.
Godmanis et al., "Exciton–Phonon Interaction in Cristalline and Vitreous SiO2", Phys. Stat. Sol. (b) 116, 279 (1983).
Skuja, "Optically active oxygen–deficiency related centers in amorphous silicon dioxide" Journal of Non–Crystalline Solids 239 (1998) 16–48.
Imai et al. "Dependence of defects induced by excimer laser on intrinsic structural defects in synthetic silica glasses" Physical Review B, vol. 44, No. 10, Sep. 1, 1991.
esp@cenet Abstract for EP 0 531 661.

*Primary Examiner*—Michael Colaianni
(74) *Attorney, Agent, or Firm*—Andrew L. Tiajoloff

(57) ABSTRACT

The invention concerns a quartz glass body for an optical component for the transmission of UV radiation with a wavelength of 250 nm and less, especially for a wavelength of 157 nm, as well as a process for the manufacture of the quartz glass body where fine quartz glass particles are formed by flame hydrolysis of a silicon compound, deposited and vitrified. Suitability of a quartz glass as represented by high base transmission and radiation resistance depends on structural properties caused by local stoichiometric deviations, and on the chemical composition. The quartz glass body according to the inventions is distinguished by a uniform base transmission (relative change of base transmission $\leq 1\%$) in the wavelength range from 155 nm to 250 nm (radiation penetration depth of 10 mm) of at least 80%, a low OH content (less than 10 ppm by weight) and a glass structure substantially free from oxygen defect centers. A quartz glass body of this kind is manufactured by a process which allows bulk embedding of hydrogen or oxygen into the glass network in that at least a two stage heat treatment takes place at temperatures ranging from 850° C. to 1600° C. before the vitrification, the last stage comprising sintering at a temperature between 1300° C. and 1600° C. in an atmosphere containing hydrogen or oxygen, or a nonflammable mixture of these substances.

8 Claims, 2 Drawing Sheets

QUARTZ GLASS BODY FOR OPTICAL COMPONENT AND PROCESS FOR MANUFACTURE THEREOF

Figure 1:
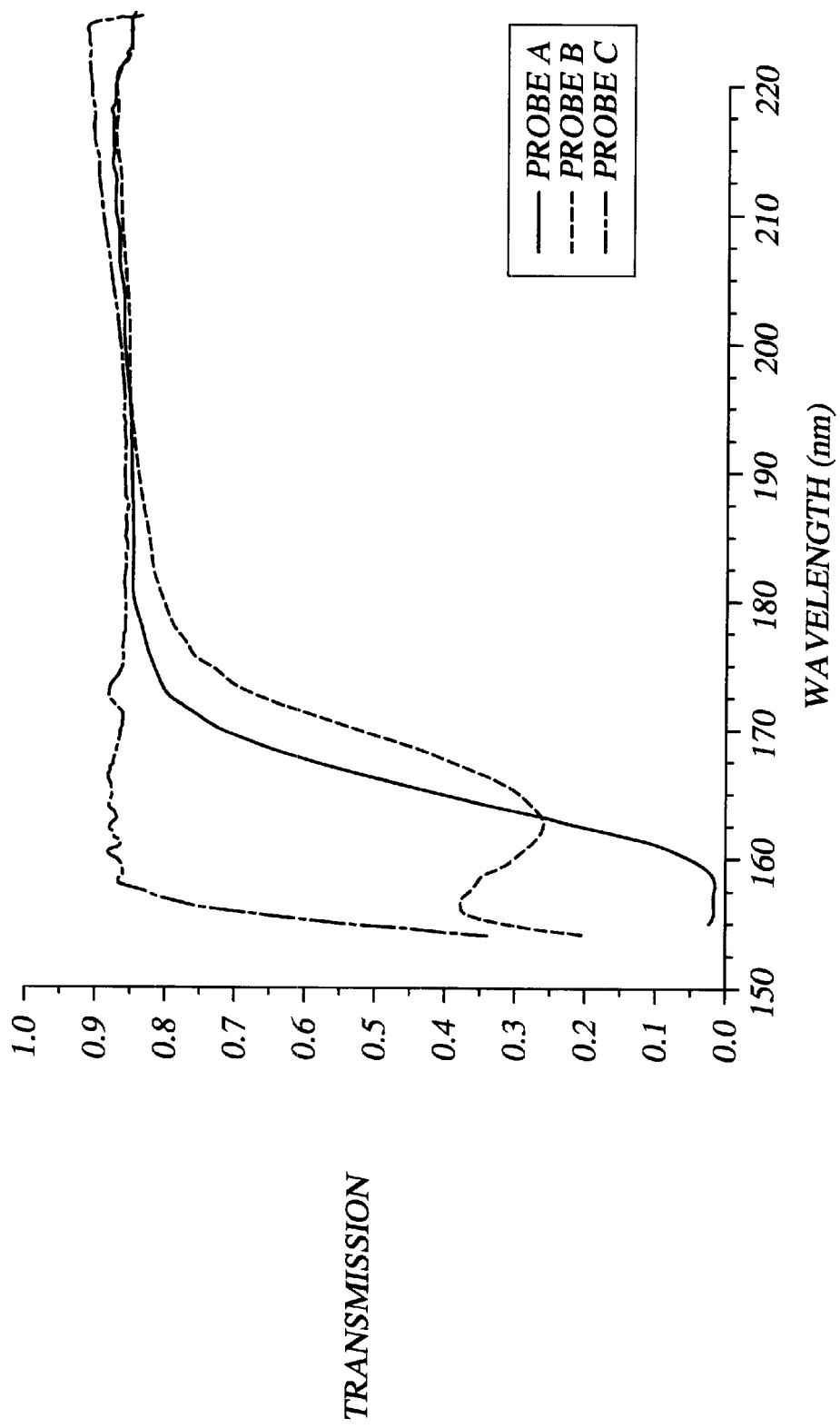

The invention concerns a quartz glass body for an optical component for transmitting UV radiation with a wavelength of 250 nm and less, in particular a wavelength of 157 nm, as well as a process for the manufacture of the quartz glass body whereby fine quartz glass particles are formed by means of flame hydrolysis of a silicon compound, deposited and vitrified.

Optical components of synthetic quartz glass are used in particular for the transmission of high energy UV laser radiation, for example in exposure optics of microlithographic apparatus for the manufacture of highly integrated circuits in semiconductor chips. Modern microlithographic devices use excimer lasers which generate high energy pulsed UV radiation with a wavelength of 248 nm (KrF lasers), 193 nm (ArF lasers), or 157 nm ($F_2$ lasers). However, with such short wave radiation, structural defects and corresponding absorptions come into play, which are characteristic of the type and quality of the respective quartz glass bodies. Suitability of a quartz glass with regard to high base transmission and radiation resistance depends on the structural properties of the glass resulting from local stochiometric deviations, and on the chemical composition of the glass. For example, high hydrogen content may contribute to a correction of defects and therefore to a slower increase of radiation induced absorption.

It has been observed that despite similar chemical or structural properties of a quartz glass the suitability as an optical component can vary if the quartz glass has been produced by different manufacturing methods. On the other hand, chemical or structural differences may be present but cannot be linked unequivocally with the observable transmission or damage characteristics in applications. Therefore, a quartz glass body for an optical component according to the invention is best characterized by its method of manufacture.

An optical component of this kind for the transmission of UV radiation with a wavelength of less than 250 nm and a method for its manufacture is known for example from EP 691 312 A1. The component described therein is obtained by means of a four stage process in which first a porous soot body is doped or dehydrated by means of a halogen compound (fluoride or chlorine compounds), resulting in the desired low OH content of the glass. This soot body is then vitrified and treated (in the vitrified state) with hydrogen or oxygen. The hydrogen or oxygen treatment takes place at relatively low temperatures (max. 500° C.) and can be therefore effective only at a relatively shallow surface depth of the quartz glass body since the diffusion velocity of hydrogen or oxygen in vitrified glass is very low. As a result, only the outer portions of a glass body produced in this manner have the required quality for applications involving very short wave UV radiation. In addition, the penetration depth of hydrogen or oxygen doping can only be determined by means of expensive analytical methods. The process according to EP 691 312 A1 is therefore by no means economical.

Quartz glass absorption in the 140–200 nm wavelength range is substantially determined by the so-called Urbach edge (drastically increasing absorption below about 155 nm. C.f. I. T. Godmanis, A. N. Trukhin, K. Huibner, "Exciton-Phonon Interaction in Crystalline and Vitreous $SiO_2$," Phys. Stat. Sol. (b), 116 (1983), 279–287) and the absorption bands of the oxygen deficiency centers (ODC I bands at 164 nm, see: L. Skulja "Optically Active Oxygen Deficiency Related Centers in Amorphous Silicon Dioxide," Journal of Non-Crystalline Solids, 239 (1998) 16–48). It is necessary for this reason to push the absorption edge to as short a wavelength as possible and to keep the concentration of oxygen deficiency centers as low as possible.

An additional absorption band (at about 160 nm) in quartz glass is caused by the OH content. Increase of the OH content shifts the band toward the longer wavelengths (cf. H. Imai, K. Arai, H. Honoso, Y. Abe, T. Arai, H. Imagawa, "Dependence of defects induced by excimer laser on intrinsic structural defects in synthetic glasses," Phys. review, B, 44 (1991) 4812–4817). Therefore, a more desirable low OH content of a porous soot body of synthetic quartz glass can be achieved by for example a heat treatment with a halogen compound. However, in quartz glass of low OH content another absorption band appears, based on the ODC of the ≡Si—Si≡type. This compound, and therefore the ODC I absorption band at 164 nm, can be removed by a hydrogen or oxygen treatment according to the following reactions:

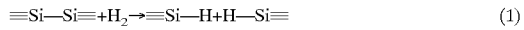  (1)

or

  (2)

The object of the present invention is therefore to provide a quartz glass body for an optical component suitable for the transmission of UV radiation of a wavelength of 250 nm or shorter, especially of a wavelength of 157 nm, in that it has maximum homogeneity and in that absorptions at the above-mentioned wavelengths are avoided. Furthermore, it is the object of the invention to provide a rational, economically effective, process for the manufacture of such a quartz glass body by overcoming the disadvantages of the prior art and by allowing bulk integration of oxygen or hydrogen into the quartz glass.

With respect to quartz glass body for an optical component, the object is achieved according to the invention as concerns the in that the quartz glass body has an OH content of not more than 10 ppm by weight, a glass structure substantially free of oxygen defect centers and that its base transmission in the 155–250 nm range is at least 80% at a radiation penetration depth of 10 mm with and the relative change of the base transmission over the usable area of the quartz glass body is a maximum 1%.

The quartz glass body according to the present invention is distinguished by a combination of characteristics that together make the quartz glass suitable in the long term as an optical component for the transmission of UV radiation of a wavelength of 250 nm and shorter, especially of a wavelength of 157 nm. Suitability as an optical component is given by the base transmission of at least 80% in the wavelength range in question. The transmission is achieved in a glass structure substantially free of oxygen defect centers and a low OH content. Of course, the quartz glass body according to the invention is distinguished by the absence of bubbles and streaks. A substantial advantage of the quartz glass body according to the invention is that the high base transmission is assured over the entire volume of the quartz glass body because during the manufacturing process this parameter is already being addressed by means of a heat treatment step before the vitrification in that defect centers are avoided or balanced out by the addition of a dopant. The high transmission uniformity of the quartz glass body according to the invention is characterized by a relative transmission change of a maximum of one percent (≦1%)

established by measurements of the transmission over the usable area of the quartz glass body.

What is meant by base transmission is the internal transmission T after deduction of the Fresnel reflection loss according to the formula $T=10^{-kd}$ where k is the decadic extinction coefficient and d is the depth of radiation penetration in the test sample.

It is furthermore advantageous for the quartz glass body as an optical component for the transmission of UV radiation of 250 nm or shorter if the strain double refraction is less than 10 nm/cm and the inhomogeneity in the refraction index $\Delta n$ is less than $20 \times 10^{-6}$. Such a quartz glass body has very high homogeneity. What is meant by inhomogeneity of the refraction index is the difference between the highest and the lowest refraction values within a sample. The refractive index differentials are measured interferometrically at a wavelength of 633 nm. The strain double refraction as a further indicator of the homogeneity of an optical glass is determined by the path differential of two light beams polarized perpendicular to one another when passing through the sample, also at a wavelength of 633 nm.

A quartz glass body featuring the preceding characteristics is preferably a blank for a mirror substrate or for a mask substrate for use in microlithography. A high base transmission is required in mirror substrates as well when used for example as radiation dishes whose reflection index is dependent on the polarization of the incident light. In general, mirror substrates are substrates for dielectric mirrors where both highly reflective as well as partially reflective mirror coatings are applied onto the substrate. In the case of the latter, a high base transmission of the mirror substrate is an absolute requirement.

If the quartz glass body according to the invention is to be primarily used as a blank for a lens in a microlithography device, quality requirements will be even higher, especially regarding the base transmission. In this case a base transmission of at least 95% has been shown to be useful, while in addition, the OH content is under 10 ppm by weight and a glass structure substantially free of oxygen defect centers is assured.

For a lens blank or a similar high quality optical application the strain double reflex value is preferably under 2 nm/cm and the inhomogeneity in the refraction index $\Delta n$ is less than $2 \times 10^{-6}$.

The reason for the higher quality requirements is that inhomogeneity of a lens blank causes uncorrectable image errors, limiting the minimum resolution of a lithography device and therefore making applications in highly integrated circuitry impossible. Therefore, the requirements placed on the blank for a lens are even higher as concerns base transmission and homogeneity than for example in the case of the abovementioned mask substrates.

Concerning the manufacture of the above described quartz glass body, the object is achieved by means of a process described below and comprising the following steps:

a) Hydrolysis of a silicon compound in a flame, creating fine quartz glass particles, b) Deposition of the fine quartz glass particles on a substrate and formation of a porous soot body, c) Heat treatment of the soot body created according to b) in at least two sub-stages at temperatures ranging from 850° C. to 1600° C., with the last sub-stage comprising sintering at a temperature ranging from 1300° C. and 1600° C. in an atmosphere containing hydrogen or oxygen, or a nonflammable mixture of these substances.

The process according to the invention assures, on the one hand, a low OH content due to the treatment of the porous soot body by a halogen or a halogen compound, and on the other hand, bulk integration of oxygen or in the quartz glass network, in order to avoid in this way the absorption bands encountered at the wavelengths region in question, i.e. under 250 nm, especially under 200 nm. Effective evolutions of the process to manufacture a quartz glass body of this kind are called vapor-phase axial deposition (VAD) or outside vapor-phase deposition (OVD). In both cases, a porous blank is first produced from synthetic quartz glass by depositing $SiO_2$ particles on a substrate by flame hydrolysis of a silicon-containing compound. According to the invention, this is then followed by heat treatment of the soot body. The heat treatment is of significant importance for the quality of the quartz glass body obtained in this manner as regards the required low OH content, as well as bulk insertion of oxygen or hydrogen into the quartz glass network. The process according to the invention is particularly economical because in addition to the bulk insertion of oxygen or hydrogen during the heat treatment, a dehydration of the soot body by means of a halogen treatment is also possible with a view to the lowest possible OH content. The heat treatment takes place in a furnace equipped with the necessary gas supply lines and is divided into at least two stages, the last stage comprising a sintering which gradually leads to vitrification of the porous soot body. The sintering takes place at between 1300° C. and 1600° C. under a continuous transition to a dense gas. In the beginning the soot body is porous, even in the sintering stage.

Advantageous embodiments of the process are listed in the subclaims.

A variant of the gas treatment during the heat treatment has been shown to be expedient and is characterized in that during the first stage of the heat treatment the atmosphere contains halogen and hydrogen, or halogen and oxygen. In the context of the invention, halogen is meant to also include halogen-containing compounds. Addition of an inert gas does not negatively affect the process or the effectiveness of the gases mentioned earlier. Fluoride or chloride compounds have been shown to be expedient among the halogens or halogen containing compounds, and as a rule the following are used: pure chlorine gas ($Cl_2$), hydrochloric acid (HCl), silicon tetrachloride ($SiCl_4$) or fluoride gas ($F_2$), sulfur hexafluoride ($SF_6$) or hexafluorethane ($F_3CCF_3$). The various gases supplied, as indicated here, have been shown to be advantageous because they cause the reactions according to the formulas (1) and (2) to run particularly easily. The use (consumption) of the reaction gases is therefore economically efficient.

The temperature during the heat treatment ranges from 850° C. to 1800° C. However, it has been shown to be advantageous to have the first stage of the heat treatment take place at between 850° C. and 1300° C. because in this way no significant densification can be observed, and therefore the effect of the gases upon the internal surface (volume) of the soot body is particularly effective. Sintering or vitrification only begins to take place slowly above about 1300° C. and slowly completes at a continuous temperature of about 1550° C. to 1600° C.

A further homogeneity improvement of the quartz glass body to be produced may be facilitated by an additional process stage d) which includes reshaping and possibly a tempering of the quartz glass body. The reshaping may for example comprise a heating of the quartz glass body in a form or under its own weight or by application of additional pressure (pressure piston). Improved homogeneity may also be achieved in that the elongated quartz glass body is placed into a glass turning machine, heated by zones (by a burner)—resulting in local softening of the quartz glass—and is twisted under a force acting in the direction of the longitudinal axis. If mechanical stresses are created due to the reshaping or homogenization treatment they can be reduced by subsequent tempering. But it is also possible that a tempering alone (without homogenization treatment) of the quartz glass body obtained according to the process steps a) to c) in a temperature range from 900° C. to 1200° C. leads to an improvement of the homogeneity.

Figure 2:
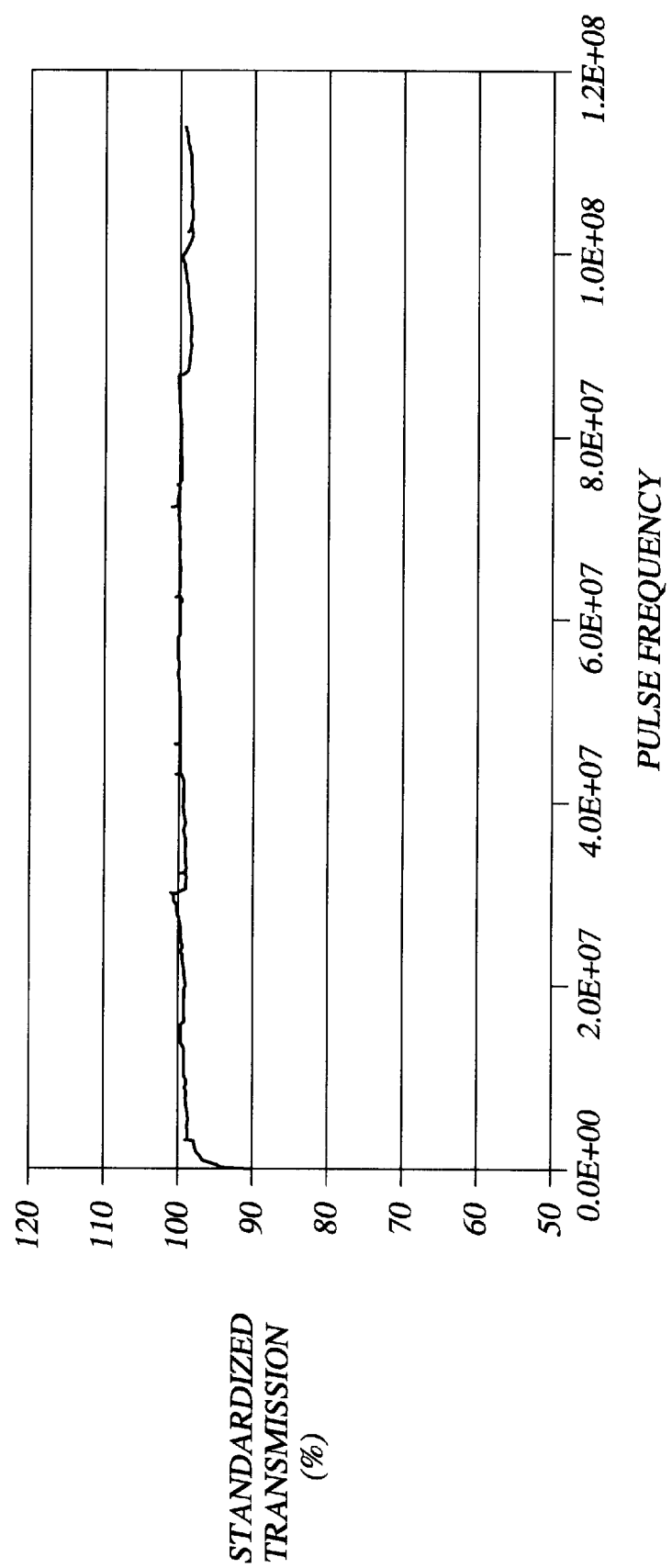

The invention will be described in more detail below by way of exemplary embodiments and drawings. Shown are in:

FIG. 1, the transmission curve in the wavelength range from 150 nm to 220 nm in non-optimized quartz glass bodies (graph A and B) and in quartz glass bodies optimized according to the invention (graph C), and in FIG. 2, the change of the norm transmission of a quartz glass body C according to the invention when irradiated by a $F_2$ laser at up to $1\times10^8$ pulses.

As can be seen in FIG. 1, the object of the invention is only achieved by a quartz glass body with a transmission curve as in graph C. This quartz glass body C is manufactured by the process according to the invention and within the parameters described below. Graph A represents a quartz glass sample which was not exposed to any halogen or oxygen treatment; the quartz glass sample or quartz glass body reflected in graph B did receive a halogen treatment during manufacture which resulted in a correspondingly low OH content matching the short wave edge at 155 nm. However, this results in increased absorption in the 170 nm to 165 nm range, which is not acceptable in an optical component to be used in micro lithography. The quartz glass body according to the invention reflected in graph C is, by contrast, suitable for such applications, which is also confirmed by the transmission graph shown in FIG. 2. It transpires that, when irradiated by an $F_2$ laser, the internal transmission remains constant at increased pulse frequency, which means that the quartz glass according to the invention is distinguished by a stable, high transmission even in continuous duty application under short wave UV radiation.

A quartz glass body of this composition may be manufactured for example as follows: First, a porous $SiO_2$ blank is obtained by creating fine quartz glass particles by means of flame hydrolysis of $SiCl_4$ and depositing them on a substrate. A rotating substrate dish is used. Due to the rotation of the substrate dish and the regulating of the deposition burners through which the hydrolysis of the $SiCl_4$ takes place, the deposited quartz glass particles gradually form a substantially cylindrical porous body (soot body) or a thick (porous) rod. The quartz glass body obtained in this manner is placed into a furnace. Then, with helium passing through, the furnace is gradually heated to the temperature of the first treatment stage (dehydration phase) of 1000° C. During the first heat treatment a mixture of hexafluorethane (10% by vol.) and helium (90% by vol.) is fed through the furnace for 4 hours. Then the furnace temperature is raised to 1350° C. (sintering stage) and pure oxygen is fed into the furnace. During this phase, lasting 12 hours, the soot body, still porous, is vitrified into a massive quartz glass body in a zone sintering process. After the vitrification phase the body is left to cool in oxygen in the furnace to about 150° C. and can be then removed for further treatment. Possible further treatment of the quartz glass body may include a homogenization treatment by tempering. For this the quartz glass body is kept at 1150° C. for about 20 hours and is then at first cooled to 900° C. at a rate of 10° C. per hour tempering furnace is switched off and the quartz glass body remains inside until it has cooled naturally to a room temperature. A sample is cut from the quartz glass body manufactured in this fashion in order to test its optical properties. The resulting transmission characteristics are represented in FIG. 1 by graph C in and in FIG. 2.

What is claimed is:

1. A process for the manufacture of a quartz glass body for an optical component for transmitting UV radiation with a wavelength of 250 nm and less, said process comprising:

a) hydrolysis of a silicon compound in a flame to create fine quartz glass particles, b) deposition of the fine quartz glass particles on a substrate to form a porous soot body, c) heat treatment of the soot body obtained in at least two stages at a temperature between 850° C. and 1600° C., where the last stage comprises sintering at a temperature between 1300° C. and 1600° C. in an atmosphere containing hydrogen or oxygen or a nonflammable combination of hydrogen and oxygen.

2. A process according to claim 1, wherein during the first stage of the heat treatment the atmosphere contains a halogen and hydrogen, or a halogen and oxygen.

3. A process according to claim 2, wherein during the heat treatment the halogen is present in the form of a compound containing fluorine and/or chlorine.

4. A process according to claim 1, wherein the first stage of the heat treatment takes place at a temperature between 850° C. and 1300° C.

5. A process according to claim 2, wherein the first stage of the heat treatment takes place at a temperature between 850° C. and 1300° C.

6. A process according to claim 3, wherein the first stage of the heat treatment takes place at a temperature between 850° C. and 1300° C.

7. A process according to claim 1, and further comprising an additional process stage wherein the quartz glass body is homogenized by reshaping and/or tempering.

8. A process according to claim 7, wherein the tempering takes place at a temperature in a range from 900° C. to 1200° C.

* * * * *